United States Patent [19]
Crus et al.

[11] Patent Number: 4,947,320
[45] Date of Patent: Aug. 7, 1990

[54] METHOD FOR REFERENTIAL CONSTRAINT ENFORCEMENT IN A DATABASE MANAGEMENT SYSTEM

[75] Inventors: Richard A. Crus; Robert W. Engles, both of San Jose; Donald J. Haderle, Los Gatos; Howard W. Herron, San Jose, all of Calif.

[73] Assignee: International Business Machines Corporation, Armonk, N.Y.

[21] Appl. No.: 219,513

[22] Filed: Jul. 15, 1988

[51] Int. Cl.$^5$ .............................................. G06F 9/44
[52] U.S. Cl. ................................... 364/200; 364/282.1; 364/283.4
[58] Field of Search .................... 364/200, 300, 900

[56] References Cited

U.S. PATENT DOCUMENTS

| | | | |
|---|---|---|---|
| 4,468,728 | 8/1984 | Wang | 364/200 |
| 4,631,664 | 12/1986 | Bachman | 364/200 |
| 4,833,597 | 5/1989 | Wakayama et al. | 364/200 |

OTHER PUBLICATIONS

E. Simon et al., "Design and Implementation of an Extendable Integrity Subsystem", Proceedings ACM Sigmod Record, vol. 14, No. 2, pp. 9–17 (1984).
E. Simon et al., "Efficient Algorithms for Integrity Control in a Database Machine", IEEE Proceedings—Trends and Applications, 1984, pp. 53–59.
A. Dogac et al., "The Design and Implementation of an Integrity Subsystem for the Relational DBMS RAP", Proceedings 4th International Conference on Entity–Relationship Approach, IEEE, pp. 295–302 (1985).

*Primary Examiner*—Raulfe B. Zache
*Attorney, Agent, or Firm*—Pryor A. Garnett

[57] ABSTRACT

A method is disclosed for enforcing referential constraints on a record-by-record basis, immediately before or after each record is manipulated and while the record is still accessed, significantly improving the system's performance. Each record is visited only once to do both the constraint checking and the manipulation (insert/update/delete). If the constraint checking fails, then the entire relational operation of which the record manipulation is a part is backed out. For insertions, each record is first inserted 30, and then constraints respective the record are enforced 32,34. For updates, the record is updated 48 after constraints respecting the record's primary key are enforced 40,42, and before constraints respecting its foreign key(s) are enforced 44,46. Deletions are performed 52 before the constraints on the deleted record are enforced 54,56. Cascade deleted 58 are handled recursively 60. The method correctly processes cyclic constraints and self-referencing rows without special handling.

10 Claims, 3 Drawing Sheets

FIG. 1

| REF'L CONSTRAINT ID | PARENT TABLE | PRIMARY KEY COLUMN | DEPENDENT TABLE | FOREIGN KEY COLUMN | DELETE RULE |
|---|---|---|---|---|---|
| 16 R1 | DEPARTMENT | DEPTNO | DEPARTMENT | ADMRDEPT | CASCADE |
| 18 R2 | DEPARTMENT | DEPTNO | EMPLOYEE | WORKDEPT | SET NULL |
| 20 R3 | DEPARTMENT | DEPTNO | PROJECT | RESPDEPT | RESTRICT |
| 22 R4 | EMPLOYEE | EMPNO | DEPARTMENT | MGRNO | SET NULL |
| 24 R5 | EMPLOYEE | EMPNO | PROJECT | RESPEMP | RESTRICT |
| 26 R6 | PROJECT | PROJNO | PROJECT | MAJPROG | CASCADE |

FIG. 2

TABLE : DEPARTMENT

| PRIMARY KEY | | FOREIGN KEY (EMPLOYEE) | FOREIGN KEY (DEPARTMENT) |
|---|---|---|---|
| DEPTNO | DEPTNAME | MGRNO | ADMRDEPT |
| A00 | SPIFFY CO | 000010 | A00 |
| D01 | DEVEL CTR | (NULL) | A00 |
| D21 | ADMIN SYS | 000070 | D01 |
| E01 | SUPPORT SER | 000050 | A00 |
| E11 | OPERATIONS | 000090 | E01 |
| E21 | SOFTWARE SU | 000100 | E01 |

FIG. 3

TABLE: EMPLOYEE

| | PRIMARY KEY | | FOREIGN KEY (DEPARTMENT) | |
|---|---|---|---|---|
| 12 | EMPNO | FIRSTNAME ••• | WORKDEPT | ••• |
| | 000010 | CHRISTINE | A00 | |
| | 000050 | JOHN | E01 | |
| | 000070 | EVA | D21 | |
| | 000090 | EILEEN | E11 | |
| | 000100 | THEODORE | E21 | |
| | 000280 | ETHEL | E11 | |
| | 000320 | RAMLAL | E21 | |

FIG. 4

TABLE: PROJECT

| | PRIMARY KEY | | FOREIGN KEY (DEPARTMENT) | FOREIGN KEY (EMPLOYEE) | | FOREIGN KEY (PROJECT) |
|---|---|---|---|---|---|---|
| 14 | PROJNO | PROJNAME | RESPDEPT | RESPEMP | ••• | MAJPROJ |
| | AD3100 | ADMIN SERV | D01 | 000010 | | (NULL) |
| | MA2100 | WELD LINE A | D01 | 000010 | | (NULL) |
| | OP1000 | OPER SPT | E01 | 000050 | | (NULL) |
| | OP1010 | OPERATION | E11 | 000090 | | OP1000 |
| | OP2000 | GEN SYS SER | E01 | 000050 | | (NULL) |
| | OP2010 | SYS SUPPORT | E21 | 000100 | | OP2000 |
| | OP2012 | SCP SYS SPT | E21 | 000320 | | OP2010 |

METHOD FOR REFERENTIAL CONSTRAINT ENFORCEMENT IN A DATABASE MANAGEMENT SYSTEM

BACKGROUND OF THE INVENTION

1. Technical Field

This invention relates to relational data base management systems, and more particularly to maintaining the logical consistency of data in relational data bases by means of referential integrity.

2. Description of the Prior Art

A data base management system is a computer system for recording and maintaining data. In a relational data base management system, data is stored in "tables" which can be viewed as having horizontal rows and vertical columns. Relational data bases were introduced by E. F. Codd in "A Relational Model of Data for Large Shared Data Banks", CACM, Vol. 13, No. 6 (June 1970), and expanded by E. F. Codd in "Extending the Database Relational Model to Capture More Meaning", ACM TODS, Vol. 4, No. 4 (Dec. 1979). The Database 2 product of the International Business Machines Corporation (IBM) is an example of a typical relational data base management system.

Within relational data bases, an important function is that of "referential integrity". Referential integrity ensures the consistency of data values between related columns of two different tables or of the same table. Required relationships between columns of tables are known as "referential constraints". A row in a "dependent table" possesses referential integrity with respect to a constraint if the value of its "foreign key" exists as the value of a "primary key" in some row of a "parent table", or if the value of its foreign key is null. In other words, every row in the dependent table must have a corresponding parent row in the parent table. If a dependent row's foreign key has no matching primary key value in the parent table, then that referential constraint is violated and there is a loss of referential integrity in the data base comprising those tables. To enforce referential constraints and thereby maintain the data base's referential integrity, the system must ensure that foreign key values always have corresponding primary key values. In implementations of referential integrity the system also ensures that primary key values are unique, a property known as "entity integrity". Referential integrity was explained by C. J. Date in "An Introduction to Database Systems", 3rd Edition Addison-Wesley Publishing Co. (1981).

In some implementations of referential integrity a "primary key index" (or "primary index") on a parent table's primary key is used to quickly locate primary key values in a table. Indexes are commonly used in data processing systems to quickly locate data rows. An index provides an ordered sequence for the rows of a table, the order being based on the values of an "index key". Primary indexes enforce the uniqueness of primary key values in the parent table by requiring that each value be unique in the index. Similarly, "foreign key indexes" on the foreign keys of dependent tables help to quickly locate particular foreign key values.

Referential constraints must be enforced whenever the data of the data base is manipulated so as to affect primary or foreign keys. In relational data base management systems which use the Structured Query Language (SQL), data is primarily manipulated by the LOAD, INSERT, UPDATE, and DELETE commands and their resulting operations. The LOAD and INSERT commands both add data to the data base, with LOAD typically adding many rows and INSERT adding only a few. UPDATE changes the contents of one or more rows of data, and DELETE deletes one or more rows. Whenever one of these operations occurs, the referential constraints involving the affected rows must be enforced to ensure the data base's referential integrity. The prior art contains a number of different methods for implementing referential integrity and enforcing referential constraints.

One prior art method for enforcing referential constraints first checks for constraint violations which would be caused by a pending manipulation (e.g., a load, insert, update, or delete operation), and then performs the manipulations if no constraint would be violated. These checking and manipulating steps are executed on a transaction-by-transaction or statement-by-statement basis as each transaction or statement is presented for execution. A single statement typically manipulates one or a few rows. A transaction typically consists of several statements, and therefore manipulates even more rows. In this prior art method, because the manipulation and enforcement phases are performed separately on the data for each statement or transaction, two passes through the data are required. Each pass through the data requires that each affected row be accessed and read, a time-consuming operation in most data processing systems. Performing two passes is quite inefficient, and slows the system's performance.

Another prior art method reverses the manipulation and enforcing phases described above, but still requires two passes through the data. This method defers constraint enforcement until after the data has been manipulated, and deletes or undoes all the manipulations if any constraint has been violated. Again, because the manipulation and enforcement phases are performed separately over several rows, processing time is increased and the system's performance suffers accordingly. There is thus a need for a method of enforcing referential constraints which uses only a single pass through the data.

A third prior art version of referential integrity incorporates paths or "links" representing constraints between a parent and its dependent records into the basic access path to the parent data. This method of "linked" referential constraints is typically implemented by using a chained list to go from a parent to all its dependents, or by using a B-tree rooted in the parent to point to all dependents. These linked methods suffer from several disadvantages. One is that the enforcement of such linked referential constraints requires special provisions for detecting and resolving self-referencing and cyclic constraints. Another is that constraints cannot be added to or deleted from existing data without modifying the links themselves, which typically requires restructuring the data. There is therefore a need for an efficient method of enforcing referential constraints which allows ready modification of the constraints without restructuring the data.

SUMMARY OF THE INVENTION

One object of this invention is therefore to provide a method for enforcing referential constraints which does not require two passes through the data being updated.

Another object of this invention is to provide a method for enforcing referential constraints in which self-referencing and cyclic constraints can be enforced in the same manner as other types of constraints, without requiring special handling.

This invention achieves these and other objects by providing an improved method for enforcing referential constraints. The method is useful in any data base management system in which records of data are manipulated in response to operations which may affect multiple records. The improved method of this invention enforces the referential constraints involving each record before another record is accessed by the same operation. One particularly advantageous implementation of the invention enforces the constraints after insertions or deletions of records but before updates of primary keys and after updates of foreign keys.

Other features and advantages of the invention will be understood from the following detailed description of its presently preferred embodiment, taken with the accompanying drawings.

DETAILED DESCRIPTION OF THE PREFERRED EMBODIMENT

Terminology

Figure 1:
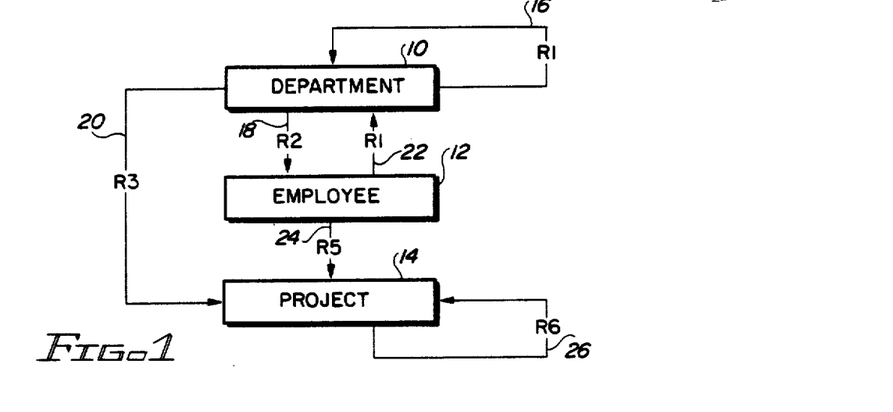
FIG. 1 shows a relational data base having three tables related by six referential constraints.
Figure 2:
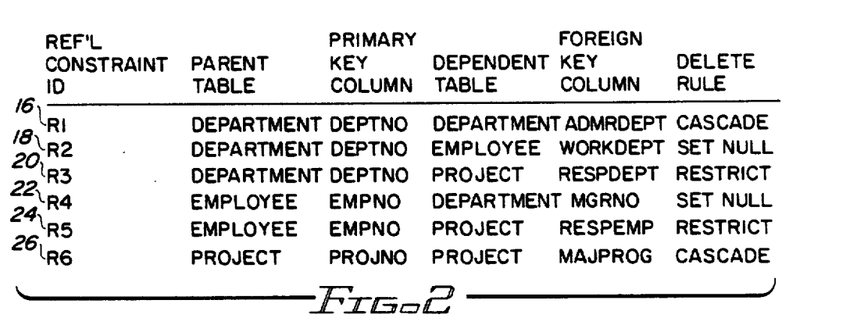
FIG. 2 lists the specifications of the referential constraints of FIG. 1.
Figure 3:
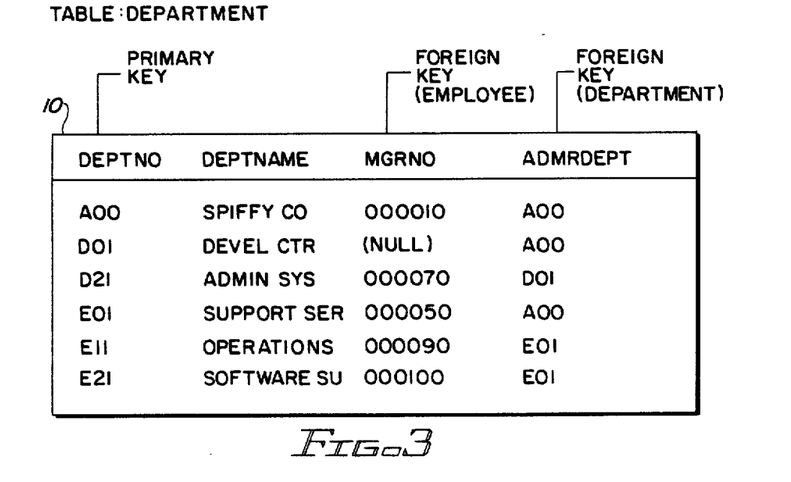
FIG. 3 shows the DEPARTMENT table of FIG. 1, including its primary and foreign keys and sample data.
Figure 4:
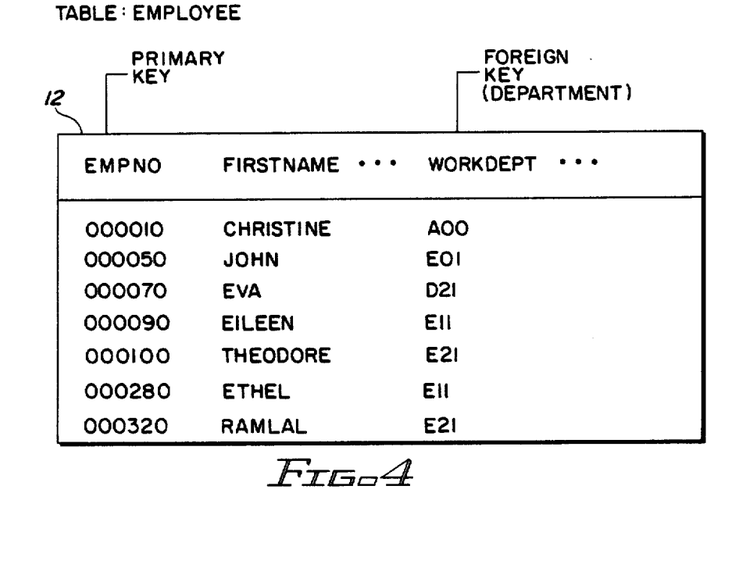
FIG. 4 shows the EMPLOYEE table of FIG. 1, including its primary and foreign keys and sample data.
Figure 5:
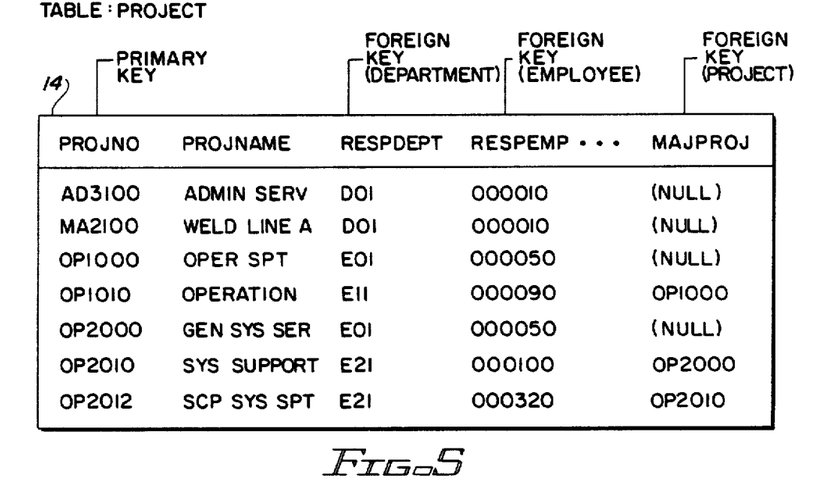
FIG. 5 shows the PROJECT table of FIG. 1, including its primary and foreign keys and sample data.

A relational data base management system is a computer system for recording and maintaining data represented as groups of tables related by referential constraints. FIGS. 1 and 2 show a relational data base 10 having three tables related by six referential constraints. The DEPARTMENT table 10 describes each department in an enterprise by number DEPTNO and name DEPTNAME, and identifies its manager MGRNO and the number ADMRDEPT of the department to which it reports. The EMPLOYEE table 12 identifies all employees by an employee number EMPNO, lists basic personnel information, and identifies the department WORKDEPT in which the employee works. The PROJECT table 12 describes each project in which the business is currently engaged, listing the project number PROJNO, project name PROJNAME, employee responsible, department responsible, schedule dates, and identifying the major project MAJPROJ of which the individual project is a part. Sample data for these tables is shown in FIGS. 3–5.

The tables of FIG. 1 are related to each other and to themselves by six referential constraints, as listed in FIG. 2. Constraint R1 16 requires the reporting department ADMRDEPT in the DEPARTMENT table 10 to be a valid department number DEPTNO in the DEPARTMENT table. Thus, the parent table of constraint R1 16 is DEPARTMENT, the primary key is the DEPTNO column in the DEPARTMENT table, and the primary index is the DEPTNO index. The foreign key of constraint R1 16 is the ADMRDEPT column of the DEPARTMENT table 10, making DEPARTMENT the dependent table as well as the parent. Because its parent and dependent tables are the same, constraint R1 16 is a self-referencing constraint.

Constraint R2 18 requires each employee's work department WORKDEPT (foreign key) in the EMPLOYEE (dependent) table 12 to be a valid department DEPTNO (primary key) in the DEPARTMENT (parent) table 10. Constraint R3 20 states that the responsible department RESPDEPT in the PROJECT table 14 must be a valid department DEPTNO in the DEPARTMENT table 10. Constraint R4 22 requires the manager MGRNO of a department in the DEPARTMENT table 10 to be a valid employee EMPNO in the EMPLOYEE table 12. Constraint R5 24 requires the responsible employee RESPEMP for a project in the PROJECT table 14 to be a valid employee EMPNO in the EMPLOYEE table 12. Finally, constraint R6 26 states that the major project MAJPROJ of a project in the PROJECT table 14 must itself be a valid project number PROJNO in the PROJECT table 16. R6 is also a self-referencing constraint.

To summarize the terminology used in this description, the term "row" refers to the external view of a record as it exists within a table, while "record" refers to the internal representation of data in the row as it is stored within a data base. A "parent row" is a row of a "parent table", and has a "primary key value" matching foreign keys values in one or more dependent rows. A "dependent row" is a row of a "dependent table", and has a "foreign key value" that matches the primary key value of some parent row. A "self-referencing constraint" is a constraint defined within the same table—that is, the foreign key references a primary key in the same table. Within a self-referencing table there may exist "self-referencing rows", where the foreign key matches the primary key in the same row. Constraints R1 16 and R6 26 are self-referencing. A "cycle" is a set of constraints such that a table within a cycle is a dependent of itself. Constraints R2 18 and R4 22 form a cycle. Within cycles, a cycle of rows may exist where a given row is a dependent of itself. Self-referencing constraints and cycles pose special problems of support in referential integrity, and their support is a feature of this invention.

A "relationship descriptor" or "constraint descriptor" defines a single referential constraint, identifying the parent and dependent tables and the columns making up the foreign key. The relationship descriptor also identifies the parent table, and the primary index on the primary key of the parent table. The primary index in turn identifies the columns of the primary key. If an index is defined on the columns of the foreign key, which is optional, then the relationship descriptor also identifies this foreign key index.

The relationship descriptors are preferably chained off of the table's record-type descriptor (also referred to as the table descriptor). Placing the relationship descriptors in these in-memory control blocks provides rapid access to the descriptors during constraint enforcement. However, for purposes of using the method of this invention, it is only necessary that the elements defining the referential constraints affecting the data base's tables somehow be accessible during enforcement of the constraints on the records of those tables.

Overview of Record-Level Constraint Enforcement

According to this invention, referential constraints are enforced at the time each record is manipulated, such as by a load, insert, update or delete command. Whenever a manipulation is invoked, the table descriptor that describes the table to which the record belongs is consulted to see if there are any referential constraints to be enforced for the specific operation being performed. The presence of constraints is indicated by an identifier in the table descriptor of the first relationship descriptor representing a constraint on that table.

If a referential constraint affecting the record is identified, then the referential constraint is enforced. The exact algorithm for checking is different for each type of manipulation (insert/update/delete), with each algorithm being described in detail below. If any referential constraint associated with the record's manipulation is violated, then all manipulations done during the statement or transaction up to the detection of the violation are undone or "backed out", and an error return code indicating the specific constraint violation is passed back to the user or application.

Figure 6:
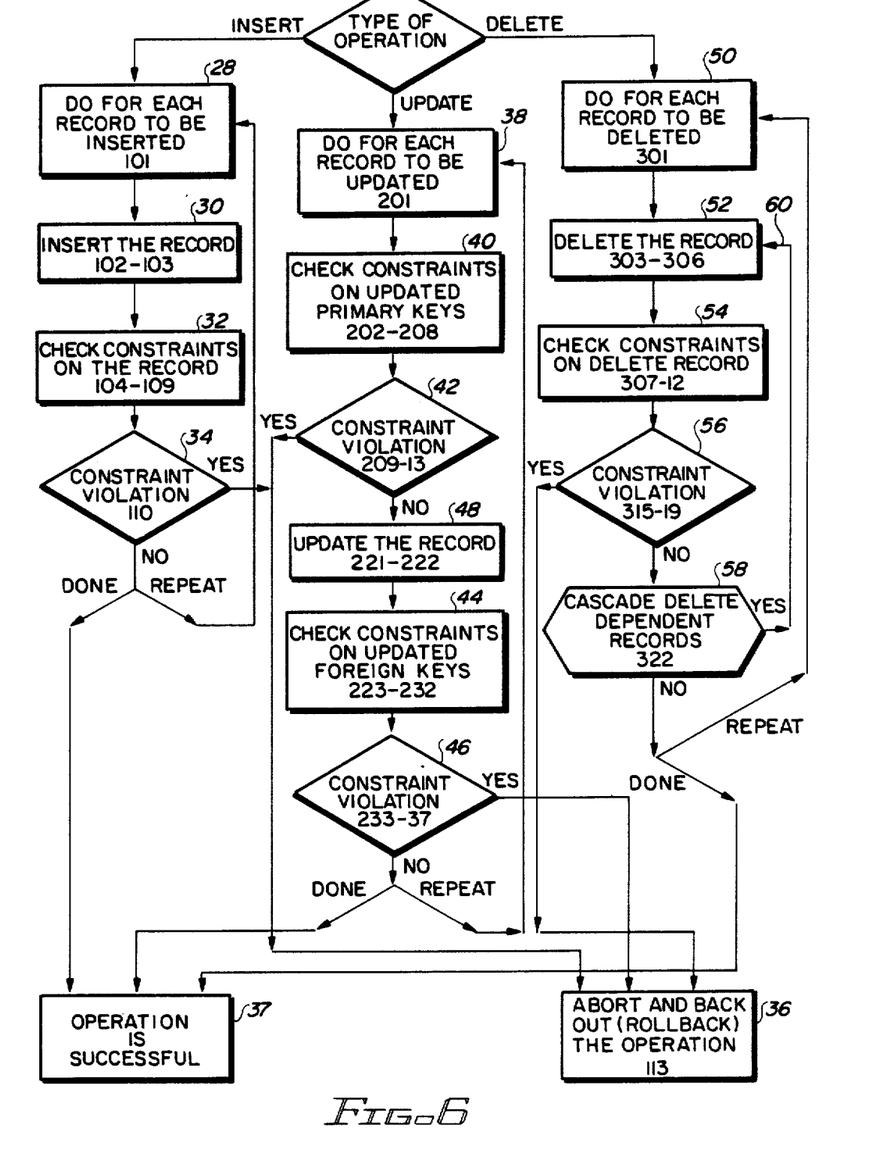
FIG. 6 is a schematic overview of this invention's methods for enforcing referential constraints during insert, update, and delete operations.

FIG. 6 provides a schematic overview of the preferred embodiments of this invention's method of record-level constraint enforcement for the three major SQL commands which manipulate relational data base tables—INSERT, UPDATE and DELETE.

Constraint Enforcement During Insert Operations

As shown by reference numeral 28 of FIG. 6, when a table is manipulated by inserting new records, each record is inserted and its constraints enforced separately from the other records in the insert operation. First the record is inserted 30 into the table, and all indexes for that table are connected to the new record, i.e., an entry for the new record is inserted in each index. Then the referential constraint check is performed 32 for each constraint in which the record is a dependent, to ensure that the parent table contains a record with a primary key value matching the foreign key value contained in the newly inserted record. This is done by searching the primary index of the parent table, which is identified in the relationship descriptor, for a key value that matches the foreign key of the row being inserted. If a matching index key is found, it means that a row exists in the parent table with a primary key that matches the foreign key, and the referential constraint is satisfied. This check is repeated for each additional constraint in which the record being inserted is a dependent.

If a matching primary key value is not found 34 for an inserted record subject to a referential constraint, then that constraint is violated and error processing 36 is performed. Error processing consists of backing out from all manipulated tables and indexes those manipulations that occurred on behalf of the insert command up to the point of error, and returning an error return code to the user. Methods of backing out aborted commands and operations are well known in the prior art.

If all records are inserted without constraint violations, the operation is successful 37, and the changes to the data base are complete.

The method of inserting first and checking second allows this invention to handle self-referencing rows normally, without requiring special programming. By inserting the primary key and associated index entry first, the primary key that matches the new foreign key in the same row will always be found when the constraint checking is performed after the insert, thus satisfying the constraint.

Table 1 shows a pseudocode implementation of this invention's method for enforcing referential constraints during inserts.

TABLE 1

| | Pseudocode for Enforcement During Insert | |
|---|---|---|
| 101 | DO for each record included in the insert. | |
| 102 | Insert record into the table. | |
| 103 | Connect record into all indexes. | |
| 104 | IF record is a dependent in any relationship THEN | |
| 105 | DO for each relationship in which record is a dependent. | |
| 106 | Extract the foreign_key from the record. | |
| 107 | IF the foreign_key is not null THEN | |
| 108 | DO. /= check for existence of | =/ |
| | /= matching primary key | =/ |
| 109 | Search the index on the primary_key of the parent table to find an index entry with primary_key = foreign_key. | |
| 110 | IF entry doesn't exist THEN | |
| | /= primary key not found | =/ |
| 111 | DO. /= process referential | =/ |
| | /= constraint violation | =/ |
| 112 | SET return_code to indicate error on foreign key. | |
| 113 | GO TO common abort processing procedure. | |
| 114 | END. | |
| 115 | ELSE /= primary key exists | =/ |
| | /= no error processing | =/ |
| | /= required | =/ |
| 116 | DO nothing. | |
| 117 | END. | |
| 118 | END. | |
| 119 | ELSE /= foreign_key is null | =/ |
| | /= no constraint checking required | =/ |
| 120 | DO nothing. | |
| 121 | END. | |
| 122 | END DO for each relationship in which the record is a dependent. | |
| 123 | ELSE /= record not a dependent | =/ |

TABLE 1-continued

| | Pseudocode for Enforcement During Insert | |
|---|---|---|
| | /= no constraint checking required | =/ |
| 124 | DO nothing. | |
| 125 | END. | |
| 126 | END DO for all records included in the insert. | |

In Table 1, lines 101–126 form a DO-loop which inserts into a table in turn each record included in an insert command or operation. The first action taken for each record is its actual insertion into the table, in line 102. It is important that the record be inserted first, before referential constraints are checked, so that a self-referencing row constraint will be enforced by the common algorithm without special handling or code.

Line 103 connects the record into all indexes that are defined on the table into which the record is being inserted. To "connect into an index" means to insert an entry referencing the new record into the index, so that the index may be used as a path to find the record. It is important that the indexes be connected before referential constraints are checked, so that a self-referencing row in which the primary key matches the foreign key in the same newly inserted row will be found when the primary index is searched in line 109.

Line 104 consults the record-type descriptor of the table to see if the table is a dependent in any relationship (referential constraint). If the record in not a dependent in any relationship, the constraint enforcement code (lines 105–122) is skipped, nothing is done (lines 124–125), and the next record to be inserted is processed.

If the record is a dependent in any relationship (line 104), then the constraints defined by all such relationships are enforced in lines 105–121. Lines 105–121 are a DO-loop which enforces upon the newly inserted record each constraint in which the table containing the record is a dependent. In insert operations, constraint enforcement requires that each foreign key value in the inserted record match a primary key value of some record in the parent table of the associated constraint. The relationship descriptor identifies the columns of the foreign key in the dependent table, so that the foreign key can be extracted from the inserted record in line 106.

If any column of the foreign key is null (line 107), then the entire foreign key value is considered to be null and the current referential constraint cannot be enforced against the record. In this case the constraint enforcement code of lines 108–118 is skipped, and nothing is done (lines 120–121).

Lines 108–118 enforce a single referential constraint on the single record being inserted by checking that a matching primary key exists for the foreign key being inserted, and if none is found by aborting the insert operation. The relationship descriptor identifies the index on the primary key of the parent table, so that the matching primary key can be located (if it exists). Line 109 searches the index on the primary key of the parent table for a target primary key value that matches the foreign key value extracted in line 106, and returns an indication of whether the target primary key value exists in the primary index. If the primary key exists then the referential constraint is satisfied, the error processing code (lines 111–114) is skipped, and nothing is done (lines 116–117).

If the target primary key value does not exist, i.e., if there is no entry in the primary index matching the foreign key value (line 110), then the referential constraint is violated and the error is processed in lines 111–114. Line 112 sets a return code from the insert operation to identify the error as a referential constraint violation. Line 113 initiates a common abort processing procedure which backs out the insert of the record just performed, as well as the insert of any previous records which were successfully inserted (without error) on behalf of the same insert operation. Abort processing procedures for backing out data base operations are well known in the art, and are not described further. Thus, the entire insert operation is backed out and rendered unsuccessful when the first referential constraint error is encountered.

Each relationship descriptor also identifies the next relationship descriptor in which the same table is a dependent, so that the DO-loop between lines 105 and 122 may continue "for each relationship in which the record is a dependent." When all dependent relationship descriptors have been enforced successfully the DO-loop (lines 105–122) is exited, and next record in the insert operation is processed. The outer DO-loop (lines 101–126) over the records to be inserted is repeated until all records included in the overall insert operation have been inserted and their referential constraints enforced, at which time the insert operation is determined to be successful.

An example of this invention's enforcement of referential constraints during insert operations is discussed next. Consider the SQL statement:

INSERT INTO PROJECT VALUES ('AD3110','GEN AD SYS','D21', '000070', . . . 'AD3100')

which inserts the following row into the PROJECT table 14 shown in FIG. 5.

| PROJNO | PROJNAME | RESPDEPT | RESPEMP | ... | MAJPROJ |
|---|---|---|---|---|---|
| AD3110 | GEN AD SYS | D21 | 000070 | | AD3100 |

According to the method of record-level constraint enforcement shown in FIG. 6, the record is inserted 30 into the PROJECT table 14, and the table's indexes are connected, and then the referential constraints R3 20, R5 24, and R6 26 are enforced 32 in turn.

First, constraint R3 20 is enforced against the new record in the PROJECT (dependent) table 14. This constraint requires that the newly inserted project row's responsible department RESPDEPT (the foreign key) reference a valid department DEPTNO (the primary key) in the DEPARTMENT (parent) table 10. Enforcement begins by extracting the foreign key value 'D21' from the RESPDEPT column of the newly inserted record. Since this value is not null, the index on the primary key DEPTNO is searched to find an entry for the value 'D21'. A matching value is found ("ADMIN SYS"). Constraint R3 20 is therefore satisfied by the newly inserted project row, and no referential violation exists.

Constraint R5 24, requiring that each project's responsible employee RESPEMP be valid, is enforced next. The foreign key value '000070' is extracted from the newly inserted record, and since it is not null the primary index EMPNO in the EMPLOYEE table 10 is searched for an entry for '000070'. Such a value is found, and constraint R5 24 is therefore satisfied by the new record.

Finally, constraint R6 26 which requires each project's major project MAJPROJ to itself be a valid project, is enforced. The foreign key value 'AD3100' is extracted from the MAJPROJ column of the newly inserted record in the PROJECT table 14. Since this valus is not null, the primary index PROJNO in the PROJECT table 14 is searched for an entry for 'AD3100'. Such an entry is found, and constraint R6 26 is satisfied.

Because all three referential constraints are satisfied by the new project row, it is therefore successful. If more than one record were to be inserted, each would be completely processed as described above to enforce referential constraints before the insertion of the next record would be begun.

Constraint Enforcement During Update Operations

In the context of referential constraint enforcement, update operations must be separated into two types: updates to primary keys values (in parent tables) and updates to foreign key values (in dependent tables). A primary key value may be updated when a row in the parent table of a referential constraint is changed. Similarly, a foreign key value may be updated when a row in the dependent table is changed. Each type of update requires a different referential constraint check, but the underlying method of enforcing constraints on a record-by-record basis is retained. FIG. 6 shows the method of enforcing constraints for each record to be updated during a given update operation 38.

When a row in a parent table is updated with a new primary key value, the old primary key value ceases to exist. If a row in the dependent table has the old primary key value as its foreign key value, then when the parent table's row is updated the dependent row no longer has a parent row, and referential integrity is violated. To detect this type of violation, as a row with a primary key value is updated, each referential constraint in which the updated table is a parent is checked to ensure that there are no rows in the constraint's dependent table with a foreign key value equal to the old primary key value. This check 40 is done before the primary row is updated, by consulting the parent table's relationship descriptor to identify the dependent table and the foreign key index (if any) which may be used to find foreign key values in the dependent table.

If a foreign key index exists, it is searched for a foreign key value matching the old primary key value. Otherwise the entire dependent table is scanned for a foreign key value matching the old primary key value. If a matching foreign key value is found 42, the referential constraint is violated and the record updates performed up to that point in the update operation are backed out (aborted) 36. If no foreign key is found, then referential integrity is satisfied. The process is repeated 38 for each constraint in which the table being updated is a parent. Assuming no such primary key constraint violations are found the record is then updated, including updating any affected indexes.

After the row's primary keys have been checked the record is updated 48. At this time the indexes on the row are also updated to reflect the new values. Such updating is well known in the art. The last step in enforcing constraints on updates is to enforce constraints on the row's foreign keys.

When a row of a dependent table is updated, the new foreign key values must be checked against each parent table for a matching primary key value. If no matching primary key value exists, then referential integrity is violated. To detect this type of violation, each referential constraint in which the updated table is a dependent is checked 44 to ensure that there is a row in the constraint's parent table with a primary key value equal to the newly-updated foreign key value. This check 44 is done after the dependent row has been updated 46, by consulting the dependent table's relationship descriptors to identify the primary key index for the constraint, and searching that index for a primary key value matching the new foreign key value. If no matching primary key value is found 46, the constraint is violated and the updates performed up to that point in the update operation are backed out (aborted) 36. This process is repeated for each constraint in which the updated table is a dependent.

The enforcement of constraints on primary keys before records are updated, and of constraints on foreign keys after records are updated, results in proper enforcement of self-referencing rows, which have the primary key matching the foreign key in the same row, without special code. In this implementation of referential integrity, direct updates of primary keys which have any matching foreign keys (i.e., dependent rows) are not allowed. This update rule is termed an "update restrict" rule in the referential integrity literature. A self-referencing row has itself as its own dependent row, therefore the primary key of a self-referencing row cannot be updated by the update restrict rule. This implementation automatically prevents direct updates to primary key values in self-referencing rows by checking that the old primary key value has no matching foreign key values, before replacing the old with the new primary key value. This always results in the new primary key value being rejected.

Updates to foreign keys of self-referencing rows may be made in this implementation, because referential constraints are enforced after updating the foreign key value. By checking the foreign key value after the primary key and associated primary key index has been updated, the primary key in the self-referencing row will always be found, thus satisfying the constraint. Table 2 shows a pseudocode implementation of this method of referential constraint enforcement during update operations.

TABLE 2

Pseudocode for Enforcement During Updates

```
201   DO for each record included in the update operation.
             /= Before updating record, enforce constraints on       =/
             /= primary keys                                          =/
```

TABLE 2-continued

Pseudocode for Enforcement During Updates

| | | |
|---|---|---|
| 202 | Extract old_primary_key from the record. | |
| | /= Note that primary key value cannot be null | =/ |
| : | | |
| 203 | IF any primary_key column will be changed THEN | |
| 204 | DO for each relationship descriptor (i.e., constraint) in which record is a parent. | |
| | /= enforce each constraint in which updated | =/ |
| | /= record is parent | =/ |
| 205 | IF an index exists on foreign_key of relationship THEN | |
| 206 | Search the index to find first index entry with foreign_key = old_primary_key. | |
| 207 | ELSE  /= no index on foreign key | =/ |
| 208 | Scan the dependent table to find first record with foreign_key = old_primary_key. | |
| 209 | IF any foreign_key found THEN | |
| | /= referential constraint is violated | =/ |
| 210 | DO. | |
| 211 | SET return_code to indicate error on update of primary key. | |
| 212 | GO TO common abort processing procedure to back out updates performed so far for this operation. | |
| 213 | END. | |
| 214 | ELSE  /= no foreign key found | =/ |
| | /= no constraint violation so far | =/ |
| 215 | DO nothing. | |
| 216 | END. | |
| 217 | END DO for each relationship descriptor in which updated record is parent. | |
| 218 | ELSE  /= no primary key will be changed | =/ |
| | /= no primary key constraint checking required | =/ |
| 219 | DO nothing. | |
| 220 | END. | |
| | /= Finished enforcing constraints on primary keys | =/ |
| : | | |
| | /= Update the record | =/ |
| 221 | UPDATE all indexes affected by the new values for the record. | |
| 222 | UPDATE the record with its new values. | |
| : | | |
| | /= Enforce constraints on foreign keys | =/ |
| 223 | IF any foreign_key column has changed THEN | |
| 224 | DO for each relationship descriptor (i.e., constraint) in which record is a dependent. | |
| 225 | IF foreign key of this relationship has changed THEN | |
| 226 | DO.  /= enforce the constraint | =/ |
| 227 | Extract the new_foreign_key_value. | |
| 228 | IF new_foreign_key_value is not null THEN | |
| 229 | DO. | |
| | /= check that matching | =/ |
| | /= primary key exists | =/ |
| 230 | Search the index on the primary_key of the parent table to find an index entry with primary_key_value = new_foreign_key_value. | |
| 231 | IF entry doesn't exist THEN | |
| 232 | DO. | |
| 233 | SET return_code to indicate error on update of foreign key. | |
| 234 | GO TO common abort processing procedure to back out entire update operation. | |
| 235 | END. | |
| 236 | ELSE  /= matching primary | =/ |
| | /= key value found | =/ |
| 237 | DO nothing. | |
| 238 | END. | |
| 239 | END. | |
| 240 | END.  /= finished checking that | =/ |
| | /= matching primary key value | =/ |
| | /= exists | =/ |
| 241 | ELSE  /= new foreign key value is null | =/ |
| 242 | DO nothing. | |
| 243 | END. | |
| 244 | END DO for each relationship descriptor in which record is a dependent. | |
| 245 | ELSE  /= no foreign key has changed | =/ |
| 246 | DO nothing. | |
| 247 | END. | |

TABLE 2-continued

| Pseudocode for Enforcement During Updates | |
|---|---|
| /= finished enforcing constraints on new | =/ |
| /= foreign key values | =/ |
| ⋮ | |
| 248   END DO for all records in the update operation. | |

In Table 2, lines 201-248 form an outer DO-loop which enforces and updates in turn each record manipulated by an update operation. There are three distinct sections within this loop: (1) enforcement 40, 42 of parent constraints on updates to primary key values (lines 202-220); (2) updating 48 the records and indexes if no constraints are violated (lines 221-222); and (3) enforcement 44, 46 of dependent constraints on updates to foreign key values (lines 223-247).

Constraint Enforcement on Updates of Primary Keys

Because each table has only one primary key, the old primary key value is extracted before any referential constraint enforcement is done (line 202).

Line 203 tests to see if any column of the primary key is being updated. Columns of the primary key are identified in the record type descriptor of the table, so that the code can readily detect if a changed (updated) column is part of a primary key. If no primary key will be changed by updating the record, then processing continues with line 218, which skips the referential constraint enforcement code of lines 204-217 for primary keys.

If a primary key will be changed, then an inner DO-loop between lines 204 and 217 is entered to enforce each primary key constraint on the record. Again, constraint enforcement when a primary key is updated requires that no old primary key values in any constraint have a matching foreign keys. The record-type descriptor identifies the relationship descriptor of the first relationship in which the table is a parent. Each relationship descriptor in turn identifies the next relationship descriptor in which the same table is a parent, so that the loop may continue "for each relationship in which the record is a parent." Line 205 consults the relationship descriptor to see if an index exists on the foreign key. If yes, line 206 searches the index for a foreign key value that matches the old primary key value extracted in line 204. If no index exists on the foreign key (line 207), then line 208 scans the entire dependent table to find a record with a foreign key matching the old primary key value from the record to be updated.

Line 209 then tests the result from either the index search (line 206) or the table scan (line 208) to determine if a matching foreign key value was found. If a match was found (line 210), then the update to the primary key of this record violates the referential constraint being enforced and lines 210-213 are executed to identify the error and abort (back out) the updates performed on the previous records in the update operation (if any). Line 211 sets the return code from the update operation to identify the error as a violation of a referential constraint on the update of a primary key. Line 212 initiates a common abort processing procedure which backs our any previously completed updates made on behalf of the update operation, rendering the entire update operation unsuccessful upon the detection of a referential constraint error for any record affected by the operation.

If, on the other hand, no matching foreign key value was found (line 214), then the referential constraint on the primary key is satisfied and needs no further processing (lines 215-216). At this point the inner DO-loop (lines 203-217) is repeated, and the current relationship descriptor is consulted to see if there is a succeeding relationship descriptor with the same parent table, which would indicate that another referential constraint requires enforcement. The inner loop is repeated until all constraints on the primary key values have been enforced, or until a violation has been detected. If no primary constraint violations are detected, processing continues with lines 221-222.

The second section of the code is executed to update the table's indexes and the record itself. Line 221 updates (or "builds") all indexes whose keys were changed by the updated columns of the record. Line 222 then updates the changed columns in the record itself.

Constraint Enforcement on Updates of Foreign Keys

Enforcement of foreign key constraints is done in lines 223-247. Line 223 tests to see if any column of a foreign key is being updated. As above, columns of foreign keys are identified in the record type descriptor of the table, so that a change (update) to a column contained in a foreign key can readily be detected. If no foreign key column has been changed by the update operation, no constraints need to be enforced and processing skips to line 245.

If any foreign key has been changed, lines 224-244 form a second inner DO-loop for enforcing constraints on any new foreign key values. As described earlier, referential constraint enforcement for the update of a foreign key means that the new foreign key value in the record must match the primary key value of some record in the parent table of the constraint. As above, the relationship descriptor identifies the columns of the foreign key in the dependent table, and also identifies the index on the primary key of the parent table. The relationship descriptor further identifies the next relationship descriptor in which the same table is a dependent, so that the inner DO-loop of lines 224-244 may be repeated "for each relationship in which the record is a dependent."

Line 228 tests to see if any column of the new foreign key value is null. If so, then the entire foreign key value is considered to be null, preventing enforcement of the referential constraint against this updated record, and processing skips over the remaining constraint enforcement code (lines 229-240) and proceeds to the next constraint (lines 241-244).

If the new foreign key is not null, then the constraint is enforced against it (lines 230-239). Enforcement of a referential constraint on the new value of a foreign key requires ensuring that a matching primary key exists for the new foreign key. If no such matching primary key value is found, the update operation is aborted and preceeding updates are backed out.

If the foreign key has not changed, processing skips over checking of the constraint and continues on to the next constraint. Otherwise, line 230 searches the index on the primary key of the parent table (identified in the relationship descriptor) for a primary key value that matches the new foreign key value, and returns an indication of whether or not the key value exists in the index.

Line 231 tests if a matching primary key value was found. If one exists (line 236), then the referential constraint is satisfied and processing proceeds (lines 237-238) to enforce the next constraint. However, if the primary key is not found in the primary key index, and therefore does not exist (line 231), then this constitutes a referential constraint error and lines 232-235 are executed to process this error as described above for lines 210-213. As before, the entire update operation is aborted and preceeding updates are backed out when a referential constraint violation is detected.

After the execution of lines 236-238 (matching primary key found, referential constraint satisfied), or lines 241-243 (new foreign key is null), the inner DO-loop of lines 224-244 is reentered and the current relationship descriptor is consulted to see if there is a next dependent relationship descriptor for the table containing the record being updated same dependent table. The loop is repeated until all dependent constraints have been satisfied, or until a violation has been detected.

Having checked and satisfied all parent (lines 202-220) and dependent (lines 223-247) referential constraints, the outer DO-loop between lines 201 and 248 is repeated for each record affected by the update operation. If all updated records satisfy all of their respective referential constraints, then the update operation is considered to be successful.

Examples of Enforcement on Updates

The operation of the pseudocode fragment of Table 2 is best illustrated by discussing several examples of its use, with reference to FIGS. 1-5 and Table 2. In each of the examples that follow, the data shown in the tables above is the starting state. Each example gives the relational operation to be performed in terms of an SQL statement, then describes the record-level operations that enforce the referential constraints according to the invention.

As a first example, consider the SQL statement:
UPDATE PROJECT SET PROJNO='OP2015'
WHERE PROJNO='OP2012'
which updates the row having project number 'OP2012' by replacing that project number with the new number 'OP2015'. As mentioned earlier, the project number PROJNO is the primary key of referential constraint R6 26. Since there are no rows that depend on the old primary key value of 'OP2012', this update will be successful.

The constraints respecting this update operation are enforced as follows. First, the record in the PROJECT table 14 having project number PROJNO equal to 'OP2012' is found and the old primary key value 'OP2012' is extracted (line 204). Next, the PROJECT table 14 is scanned for a record having a matching value of the foreign key MAJPROJ (line 208), since there is no index on the MAJPROJ column of the PROJECT table line 205). No record in the PROJECT table 14 has a value of MAJPROJ equal to the updated record's old primary key value of 'OP2012' (lines 214-216). Constraint R6 26 is therefore satisfied, and the record is updated (line 251). Because there are no foreign keys updated, the operation is successful.

As a second example of the operation of the pseudocode of Table 2, consider the SQL statement:
UPDATE DEPARTMENT SET DEPTNO='D11'
WHERE DEPTNO='D21'
This statement will update the row with department number 'D21' to department number 'D11'. However, the department number DEPTNO is the primary key of three constraints (R1, R2, and R3), and because of a referential constraint violation involving constraint R2 and the EMPLOYEE table 12 this update will not be successful.

First, the row to be updated is located in the DEPARTMENT table 10. Enforcement of constraints may be done in any order, and in this example constraint R3 20, which concerns the projects for which departments are responsible, will be enforced first. Enforcement begins by extracting the old primary key value 'D21' from the record (line 204). Next, the PROJECT table 14 is scanned (line 208) for a record in which the responsible department (foreign key) RESPDEPT is equal to the department record's old primary key value of 'D21'. There is none (line 214), so this update satisfies constraint R3 20.

Enforcement of constraint R2 18, which concerns the departments in which employees work, scans the EMPLOYEE table 12 (line 208) for an employee record having a work department (foreign key) WORKDEPT equal to the old primary key value of 'D21'. The record with employee number EMPNO '000070' is found (line 209). The presence of this record with a foreign key value equal to the old primary key value constitutes a referential constraint violation, and lines 210-213 are executed to abort the update. Constraint R1 16 is not enforced because the operation is aborted.

A third example of the operation of the pseudocode of Table 2 involves the updating of a foreign key. Consider the SQL statement:
UPDATE EMPLOYEE SET WORKDEPT='E31'
WHERE EMPNO='000320'
which updates the row in the EMPLOYEE table 12 having employee number EMPNO '000320' from department number WORKDEPT 'E21' to 'E31'. Only constraint R4 22 is enforced because WORKDEPT is the only foreign key affected by this update. Because of a referential constraint error the update will not be successful.

The record in the EMPLOYEE table 12 having employee number EMPNO '000320' is found. Because the primary is not changing, the record is updated (lines 221-222). The foreign key WORKDEPT has changed (line 223), so the new foreign key value 'E31' is extracted (line 227). The new foreign key value is not null (line 228), so the primary index is searched for a primary key value in the parent table DEPARTMENT 10 matching the new foreign key value (line 232). No row in the DEPARTMENT table 10 has a department number DEPTNO of 'E31' (line 231), so constraint R4 22 is violated, and the operation is aborted and the update backed out (lines 232-235).

Constraint Enforcement During Delete Operations

In enforcing referential constraints during delete operations, the problem is that primary key values may be deleted, which requires that any dependent rows with matching foreign keys be checked for violations of referential integrity. The method used to find foreign keys in each dependent table matching the deleted primary key in the parent table is the same as described above under the heading "Constraint Enforcement on Updates of Primary Keys". The index, if any, on the foreign key is searched, otherwise the dependent table is scanned. When a foreign key is found the action taken depends on the particular delete rule specified when the constraint was created.

There are three delete rules: DELETE RESTRICT, DELETE SET NULL, and DELETE CASCADE. The DELETE RESTRICT rule prevents the deletion of a primary key value if any matching foreign key value exists, and is enforced in the same manner as updates to primary keys. If a matching foreign key value is found then a constraint violation has taken place and the operation is aborted and backed out. If no matching foreign key value is found, the constraint on that record is upheld and the record delete is successful.

The DELETE SET NULL rule sets all nullable columns of the foreign key to null value upon deletion of the primary key value matching the old foreign key value. DELETE SET NULL changes all formerly matching foreign key values in the dependent table to null.

DELETE CASCADE operates similarly to DELETE SET NULL, but instead of setting the foreign key values to null, DELETE CASCADE deletes all records in the dependent table containing the formerly matching foreign key values. These deletions are then "cascaded" from the dependent table to its dependent tables (those tables which have the deleted record's table as their parent table), with the resulting deletes of dependent records being known as "cascade deletes." The table ("record-type") descriptor of the deleted record's dependent table is consulted to see if it also a parent table in another referential constraint. If yes, a new delete constraint enforcement operation is initiated in which the the cascade-deleted record is treated as a parent, and its delete rule (RESTRICT, SET NULL, or CASCADE) is enforced. If its delete rule is DELETE CASCADE, the same process just described is repeated. Otherwise, a DELETE SET NULL or DELETE RESTRICT operation is performed. DELETE CASCADE is thus a recursive operation that propagates to all dependent tables connected to a given parent table from which a record is being deleted. If a DELETE RESTRICT error is encountered along the way, then the entire delete operation, including all of its cascaded deletes, is backed out.

The delete routine, like the insert and update routines, processes separately 50 each record in the delete operation, record by record. As seen in FIG. 6, in order to handle self-referencing rows and cycles of rows, the delete algorithm first deletes 52 the record, then performs the constraint checking 54, 56. This ensures that a record will be found only one time in the search for dependents. Cascade deletes 58 are handled by recursive reentry 60 to the delete routine.

Table 3 contains a pseudocode implementation of this method of enforcing referential constraint during delete operations.

TABLE 3

| | Pseudocode For Enforcement During Deletes | |
|---|---|---|
| 301 | DO for all records to be deleted during the delete operation. | |
| 302 | CASCADE: /= recursive entry point to delete | =/ |
| | /= successive dependent records in | =/ |
| | /= cascade delete | =/ |
| 303 | Disconnect record from all indexes. | |
| 304 | IF record is a parent in any relationship THEN | |
| 305 | Extract the old primary key value from the record, and save it for later comparison with foreign key values. | |
| 306 | Delete the record from the table. | |
| 307 | IF record is a parent in any relationship THEN | |
| 308 | DO for each relationship in which record is a parent. | |
| 309 | IF index exists on foreign_key THEN | |
| 310 | Search the index to find first index entry with foreign key = old primary key for the relationship. | |
| 311 | ELSE /= no index on foreign key | =/ |
| 312 | Scan the dependent table to find first record with foreign key = old primary key for the relationship. | |
| 313 | IF any matching foreign key found THEN | |
| 314 | DO. /= enforce the constraint | =/ |
| 315 | IF delete rule of constraint is RESTRICT THEN | |
| 316 | DO. /= process referenial | =/ |
| | /= constraint error | =/ |
| 317 | SET return code to indicate error on delete rule of RESTRICT. | |
| 318 | GO TO common abort processing procedure. | |
| 319 | END. | |
| 320 | ELSE /= delete rule must be CASCADE | =/ |
| | /= or SET NULL | =/ |
| 321 | DO UNTIL no more foreign keys found. | |
| | /= cascade-delete or set-null | =/ |
| | /= all dependents in this | =/ |
| | /= relationship | =/ |
| 322 | IF delete rule is CASCADE THEN | |

TABLE 3-continued

| | Pseudocode For Enforcement During Deletes | |
|---|---|---|
| 323 | CALL CASCADE. | |
| | /= recursively delete | =/ |
| | /= this dependent record | =/ |
| | /= and its dependents | =/ |
| 324 | ELSE  /= delete rule must be | =/ |
| | /= SET NULL | =/ |
| 325 | SET all nullable columns of foreign key to null. | |
| 326 | Search foreign key index or scan dependent table to find next foreign key = old primary key value for the relationship | |
| 327 | END DO until no more matching foreign keys found. | |
| 328 | END DO.  /= finished enforcing the | =/ |
| | /= constraint | =/ |
| 329 | ELSE  /= no dependents exist in this | =/ |
| | /= relationship | =/ |
| 330 | DO nothing. | |
| 331 | END. | |
| 332 | END DO for each relationship in which record is a parent. | |
| | /= finished checking all constraints on | =/ |
| | /= the primary key | =/ |
| 333 | ELSE  /= record is not a parent | =/ |
| | /= no constraint checking required | =/ |
| 334 | DO nothing. | |
| 335 | END. | |
| 336 | END DO for all records to be deleted during the delete operation. | |

In the pseudocode of Table 3, lines 301–336 form an outer DO-loop which deletes all records in a table specified for a given delete operation. Line 302 is a recursive entry point to the delete process. It is named "CASCADE", and is used to enforce the CASCADE DELETE rule against the dependents of deleted records. The "CASCADE" reentry point is explained further with respect to line 323, below.

Line 303 "disconnects" the record to be deleted from all indexes that are defined on the table from which the record is being deleted. This means the the index entry which references the record being deleted is removed from the index, so that the index no longer points to the record.

Line 304 consults the record-type descriptor of the table to see if the table is a parent in any relationship (referential constraint). If yes, then line 305 extracts the old primary key value from the record and saves the old value for later use in finding matching foreign keys (lines 309–312). Since each table has only one primary key, this extraction can be done once, rather than for each relationship.

Line 306 deletes the record from the table. It is important that the record and associated index entries be deleted first, before referential constraints are checked, so that self-referencing rows and cycles of rows will be enforced without requiring special code or handling. This results because once the record and index entries are deleted, that record will not be found again in the search for matching foreign keys.

Line 307 tests the record-type descriptor of the table again to see if the table is a parent in any relationship. If no, there are no referential constraints to be enforced on this record, and the constraint enforcement code (lines 308–332) is skipped. However if the record-type descriptor identifies a relationship descriptor in which the table is a parent, the process continues with constraint enforcement (lines 308–332).

Lines 308–332 contain an inner DO-loop which enforces upon the record being deleted each constraint in which the table is a parent. The record-type descriptor identifies the relationship descriptor of the first relationship in which the table is a parent. Each relationship descriptor in turn identifies the next relationship descriptor in which the same table is a parent, so that the loop may continue "for each relationship in which the record is a parent."

Lines 309–312 look for the first foreign key value matching the old primary key value. Line 309 consults the relationship descriptor to see if an index exists on the foreign key. If so, line 310 searches that index for a foreign key value matching the old primary key value extracted in line 305. If no index exists on the foreign key (line 311), then line 312 scans the entire dependent table to find the first record with a matching foreign key.

Line 313 tests the result from either the index search or table scan, preceding, to determine if a matching foreign key value was found. If no matching foreign key value was found, then there are no dependent records in this relationship of the parent record being deleted, no constraint enforcement needs to be done, and processing continues (line 328) to enforce the next constraint.

If any matching foreign key value is found (line 313), then the dependent record so located is processed according to the delete rule of the constraint in lines 314–328. Line 315 checks the relationship descriptor to see whether the delete rule is RESTRICT. If it is, then the foreign key found in line 313 constitutes a referential constraint error, and lines 316–319 are executed to set an error return code and abort (back out) the entire delete operation. The common abort processing procedure called in line 318 backs out not only the delete of the record just performed at line 306, but also continues continues to back out the delete of any previous records which were deleted on behalf of the delete operation. The abort process also backs out any cascade deletes and/or set nulls that were previously done as part of enforcing referential constraints on the deleted records.

Thus, the entire delete operation is backed out and rendered unsuccessful if any referential constraint error is detected.

If the delete rule is CASCADE or SET NULL (line 320), the deleted record's dependents are processed in lines 321-327. In these cases, all foreign keys that match the old primary key value of the deleted record must be found and processed according to the delete rule. The DO-loop of lines 321-327 does this. Line 322 tests if the delete rule is CASCADE, and if it is, line 323 is executed. Line 323 recursively calls the entire delete process (lines 303-325), by means of the "CASCADE:" reentry point of line 302, to delete the dependent record just found and to enforce any referential constraints on the delete of that dependent record.

On the other hand, if the delete rule of the originally deleted record is SET NULL (line 324), line 325 sets to null value all nullable columns in the foreign key of the dependent record just found. This enforces the delete rule of SET NULL on the deleted record.

Upon return from the cascade delete of line 323, or after the set null action of line 325, line 326 is executed to find the next record with a foreign key value equal to the old primary key value. This can be done using the foreign key index or table scan methods described above for lines 309-312, and is not repeated in detail here. The record thus found becomes the next dependent record to be processed according to the delete rule of the constraint, and the DO-loop of lines 321-327 is executed again. If no further foreign key is found, then enforcement of this constraint associated with delete of the parent record is successful.

Following line 328 (referential constraint on all dependent records enforced), or lines 329-331 (no dependent records found), the current relationship descriptor is consulted to see if there is another relationship descriptor with the same parent table, meaning that there is another referential constraint to be enforced for the deletion of the old primary key value. If yes, the inner DO-loop of lines 308-332 is repeated until all constraints have been enforced for the deleted record, or until a constraint violation has been detected.

When line 332 (all constraints checked) or lines 333-335 (no constraint checking) have been finished, the delete of a single record and any resulting cascade deletes will have been completed successfully. The outer DO-loop (lines 301-336) is repeated until all records to be deleted by the delete operation have been processed, or until a constraint violation by one of them has caused the operation to be aborted and backed out.

Examples of Enforcement During Deletes

In each of the examples that follow, the data shown in the tables above is the starting state. Each example gives the relational operation to be performed in terms of an SQL statement, then describes the record-level operations that enforce the referential constraints according to the invention.

As a first example, consider the SQL statement:
DELETE FROM EMPLOYEE WHERE EMPNO='000070'
which deletes the row with employee number '000070' from the EMPLOYEE table 12. The EMPLOYEE table 12 is the parent in two constraints, R4 22 and R5 24, which must be enforced. Enforcement begins by locating the record in the EMPLOYEE table 12 with employee number EMPNO equal to '000070', disconnecting it from the EMPLOYEE table's indexes (line 303), and extracting and saving its old primary key value '000070' (line 305). The record is then deleted (line 306), and the relevant constraints enforced in any order.

Constraint R5 24 is enforced by finding the first record in the PROJECT table 14 having a foreign key value RESPEMP equal to the old primary key value '000070' (lines 309-312). There is none (lines 313 and 329). Therefore, the delete rule of RESTRICT is upheld and constraint R5 24 is satisfied for this deletion. The inner DO-loop (lines 308-332) is then repeated for the next constraint, R4 22.

Constraint R4 22 is enforced by finding the first record in the DEPARTMENT table 10 having a foreign key value MGRNO equal to the old primary key value '000070' (lines 309-312). The record with department number DEPTNO 'D21' is found (line 313). Because the delete rule for constraint R4 22 is SET NULL (line 320), the manager's employee number MGRNO for this dependent record is set to 'null' (line 325). There are no other matching foreign key values (DO-loop of lines 321-328) to be set to 'null' for constraint R4 22, so it is satisfied. The inner DO-loop (lines 308-332) is not repeated since all applicable constraints have been satisfied.

Finally, there are no more records in the EMPLOYEE table 12 with employee number EMPNO equal to '000070' (outer DO-loop of lines 301-336), so enforcement of constraint R4 22 is finished and the delete operation succeeds.

A second example illustrates a cascade delete, using the SQL statement:
DELETE FROM PROJECT WHERE PROJNO='OP2000'
which deletes the row with project number 'OP2000' from the PROJECT table 14. First, the outer DO-loop (lines 301-336) is entered to delete the first (and only) record with project number PROJNO 'OP2000'.

The delete routine (lines 303-332) is entered for a first time for the 'OP2000' record. That record is located, and disconnected from the PROJECT table's indexes (line 303). Because the PROJECT table 14 is the parent in a relationship (line 304), the record's old primary key value 'OP2000' is extracted and saved (line 305). The record is then deleted (line 306).

The inner DO-loop (lines 308-332) is entered for the self-referencing constraint R6 26, and the first record in the PROJECT table 14 having a foreign key value MAJPROJ equal to the old primary key value 'OP2000' is identified (lines 309-312). The record with project number PROJNO 'OP2010' is found (line 313), and the delete rule CASCADE is enforced (lines 320-328). The innermost DO-loop of lines 321-328 is entered for the record with PROJNO 'OP2010', and the delete routine is recursively reentered using the CASCADE entry point (line 302) to delete and enforce any constraints on this record.

In this second, recursive entry to the delete routine the 'OP2010' record is disconnected from its indexes (line 303), its old primary key value 'OP2010' is extracted and saved (line 305), the record is deleted (line 306), and the inner DO-loop (lines 308-332) is entered to enforce the constraints on the record's deletion. Constraint R6 26 is enforced on the record by finding the first record in the PROJECT table 14 having a foreign key value MAJPROJ of 'OP2010', the old primary key value for the record just deleted. The record with PROJNO 'OP2012' is found. Since the delete rule for constraint R6 26 is CASCADE, the innermost DO-loop of lines 321–328 is entered for the record with PROJNO 'OP2012', and the delete routine is recursively entered again using the CASCADE entry point (line 302) to delete and enforce any constraints on this record.

In the third entry to the delete routine, the record 'OP2012' is disconnected from its indexes (line 303), its old primary key value 'OP2012' is extracted and saved (line 305), the record is deleted (line 306), and the inner DO-loop (lines 308–332) is entered to enforce the constraints on the record's deletion. Constraint R6 26 is enforced on the record by finding the first record in the PROJECT table 14 having a foreign key value MAJPROJ of 'OP2012' (lines 309–312), the old primary key value for the record just deleted. There is none (line 329), so constraint R6 26 is satisfied for the deletion of project number PROJNO 'OP2012', and there are no further constraints on that deletion (line 332). The third entry of the delete routine is thus finished, returning control to the second entry at the point just after it called ("invoked") for the third entry at line 323.

Returning to the second invocation of the delete routine at line 326, the PROJECT table 14 is searched for another record having a foreign key value MAJPROJ of 'OP2010'. There is none, so constraint R6 26 is satisfied for the deletion of the record with PROJNO 'OP2010', and there are no further constraints to be enforced on that deletion (line 332). The second entry of the delete routine is thus finished, and control is returned to the first, original invocation of the delete routine immediately after line 323.

The original invocation of the delete routine resumes at line 326 by searching for the next record in the PROJECT table 14 having a foreign key value MAJPROJ of 'OP2000'. None is found. Therefore, constraint R6 26 is satisfied for the deletion of project number 'OP200'. No further constraints apply, so the overall delete operation is successful.

The third and final example illustrates a complex deletion in which two DELETE SET NULL constraints are satisfied, but a violation of a DELETE CASCADE constraint forces the operation to be aborted and backed out. The example begins with the SQL statement:

DELETE FROM DEPARTMENT WHERE DEPTNO='A00' which the row with department number DEPTNO 'A00' from the DEPARTMENT table 10. Constraints R1 16, R2 18, and R3 20 have the DEPARTMENT table 10 as their parent tables.

The operation commences by entering outer DO-loop (lines 301–336) and locating the DEPARTMENT record 'A00'. The record 'A00' is disconnected from its indexes (line 303), its old primary key value 'A00' is extracted and saved (line 305), the record is deleted (line 306), and the inner DO-loop (lines 308–332) is entered to enforce the three constraints on the record's deletion.

Constraint R3 20 is enforced on the record by finding the first record in the PROJECT table 14 having a foreign key RESPDEPT value of 'A00' (lines 309–312). Because there is none, constraint R3 20 is upheld for this deletion, and the inner DO-loop is repeated for the next constraint, R2.

Constraint R2 18 is enforced on the deletion of DEPARTMENT record 'A00' by finding the first record in the EMPLOYEE table 12 having a foreign key WORKDEPT value of 'A00' (lines 309–312). The record with employee number EMPNO '000010' is found (line 313). The delete rule for constraint R2 18 is SET NULL (line 320), so the WORKDEPT of employee number '000010' is set to 'null' (line 325). There being no other EMPLOYEE records with WORKDEPT 'A00', the innermost DO-loop (lines 321–328) is exited, leaving constraint R2 18 satisfied for the deletion of department number 'A00', and the inner DO-loop is repeated for the last constraint, R1 16.

Enforcement of constraint R1 16 against the deletion of department number 'A00' begins by finding the first record in the DEPARTMENT table 10 having a foreign key ADMRDEPT value of 'A00'. The self-referencing row 'A00' also has foreign key 'A00', but since that record has already been deleted (line 306) it is not found at this time. The search does, however, find the record with department number DEPTNO 'D01'. Since the delete rule for constraint R1 16 is CASCADE, the delete routine is recursively entered (line 323) at the CASCADE entry point (line 302) to process the cascaded deletion of department 'D01'.

The recursive deletion of department 'D01' during the second entry to the delete routine begins with the disconnection of the record from the DEPARTMENT table's indexes, the extraction and saving of that record's old primary key value 'D01', and the deletion of the record (line 303–306). Constraint R3 20 is then enforced (lines 308–332) for the deletion of department 'D01'. The first record in the PROJECT table 14 having a foreign key RESPDEPT value of 'D01' is searched for, and the record with project number PROJNO 'MA2100' is located (lines 309–313). Since the delete rule for constraint R3 20 is RESTRICT (line 315), the presence of the record for project number 'MA2100' constitutes a referential constraint error.

The constraint violation error is identified by setting an appropriate return code (line 317), and the operation to delete department 'A00' is aborted 36. All records which were deleted or set to 'null' during the operation are restored to their previous conditions by the common abort processing procedure (line 318).

Restricted Operations Due to Record Level Enforcement

It is a principle of relational data base theory that the order in which records are processed for a given operation should not affect the result of the relational operation. Because the method of this invention performs constraint enforcement at the record level, there are cases in multirow relational operations where the order of processing could affect the referential constraint outcome of the operation as a whole. For example, if the delete rule of a self-referencing constraint were RESTRICT, then the order in which the records were accessed in a multirow operation would affect the result.

Consequently, in order to preserve consistent relational results with referential integrity, this invention places restrictions on operations and delete rules that can cause inconsistent results. These restrictions are as follows:

(1) The delete rule of a self-referencing constraint must be CASCADE.

(2) The delete rules in a cycle of constraints among two or more tables must not cause any table to affect itself (via cascade) in a delete operation.

(3) In a delete operation with a subquery, the table referenced in the subquery cannot be affected via a CASCADE or SET NULL by the table from which records are being deleted. This requirement is an extension of a prior rule in relational data base theory relating to deletes with subqueries, in which the object table of the delete cannot be referenced in the subquery.

(4) An insert operation with a subselect to a self-referencing table cannot return more than one row.

(5) Multirow deletes from self-referencing tables are not allowed.

(6) Multirow updates of primary keys are not allowed.

These restrictions can be circumvented by application programming techniques or alternate methods where necessary. If a restriction is severe, the data base management system could remove the restriction by enforcing constraints in an alternate way in the specific case of the restriction.

To summarize this invention, in all three basic types of operations (INSERT, UPDATE and DELETE), referential constraint enforcement takes place at the time the individual record is manipulated. Constraint enforcement is independent of the application program and of the access path to the data. Because it is done integrally with the data update operation itself, the performance cost is minimal compared to the prior art methods which require separate access paths for data manipulation and constraint enforcement. Self-referencing rows and cycles of rows are handled automatically by the method, as a consequence of the order in which data manipulation and constraint enforcement are performed for the different types of operations. In the case of insert and delete operations, each record is inserted or deleted first, after which the constraints are enforced. If an error is detected, then the data operation is backed out. This method "optimizes for success", in that it expects constraints to be upheld most of time. In the case of update, the constraints on the primary key are enforced first, then the record is updated, and finally the constraints on the updated foreign keys are enforced.

Although a particular embodiment of the invention has been described above, it will be understood that the invention can also be implemented with several variations. For example, the referential constraints could be stored and accessed in other ways, such as in an external catalog, since it only matters that a definition of the elements of the constraint be accessible at the time of the record-level operation. Further, the constraint enforcement code could be grouped separately from the data manipulation code, instead of being combined "inline" as described above, and then invoked by a "trigger" from the data update path whenever a constraint was detected that needed to be checked during a record-level operation. Also, constraint enforcement and record manipulation could be performed in other orders than those described, provided that each record is manipulated and its constraints enforced before the next record is manipulated. Accordingly, the scope of protection of the invention is limited only by the following claims.

We claim:

1. In a method for performing operations in a data base management system, such operations including manipulating multiple records of data, the improvement characterized by steps performed by a computer of manipulating each record and enforcing referential constraints respecting such record before another record is manipulated by a same operation.

2. The method of claim 1, wherein at least one of the operations comprises the steps of:
   (a) inserting a record;
   (b) identifying any violation of a referential constraint respecting such record;
   (c) aborting such insertion if any such violation is identified.

3. The method of claim 2, wherein the step (a) of inserting the record is done before the step (b) of identifying any violation.

4. The method of claim 1, wherein at least one of the operations comprises the steps of:
   (a) identifying any referential constraint violation respecting an updated primary key of a record;
   (b) updating the record;
   (c) identifying any referential constraint violation respecting any foreign key of the updated record; and
   (d) aborting such update if either type of violation is identified.

5. The method of claim 4, wherein the step (b) of updating the record is performed after the step (a) of identifying any primary key constraint violation and before the step (c) of identifying any foreign key constraint violation.

6. The method of claim 5, wherein such update is aborted immediately after either type of violation is identified.

7. The method of claim 1, wherein at least one of the operations comprises the steps of:
   (a) deleting a record;
   (b) identifying any referential constraint violation respecting such deletion; and
   (c) aborting such deletion if any such violation is identified.

8. The method of claim 7, wherein the step (a) of deleting the record includes a cascade delete of any records dependent on the record.

9. The method of claim 7, wherein the step (a) of deleting the record is done before the step (b) of identifying any violation.

10. In a relational data base management system having tables consisting of rows of data, a method of manipulating rows and enforcing referential constraints comprising the steps performed by a computer of:
    (a) executing an operation which manipulates at least two rows;
    (b) if the operation includes inserting a row,
       (b1) inserting such row, and
       (b2) identifying any referential constraint violation resulting from such insertion;
    (c) if the operation includes updating a row,
       (c1) identifying any referential constraint violation resulting from updating any primary key of the row,
       (c2) updating the row, and
       (c3) identifying any referential constraint violation resulting from updating any foreign key of the row;
    (d) if the operation includes the deletion of a row, performing in order the steps of:
       (d1) deleting the row, and
       (d2) identifying any referential constraint violation resulting from such deletion; and
    (e) if any such referential constraint violation is identified, aborting the operation.

* * * * *